US008809788B2

(12) United States Patent
Covaro

(10) Patent No.: US 8,809,788 B2
(45) Date of Patent: Aug. 19, 2014

(54) ROTATING SENSOR FOR OCCUPANCY DETECTION

(75) Inventor: Mark Covaro, Sonoma, CA (US)

(73) Assignee: Redwood Systems, Inc., Fremont, CA (US)

( * ) Notice: Subject to any disclaimer, the term of this patent is extended or adjusted under 35 U.S.C. 154(b) by 534 days.

(21) Appl. No.: 13/281,768

(22) Filed: Oct. 26, 2011

(65) Prior Publication Data

US 2013/0107245 A1 May 2, 2013

(51) Int. Cl.
*G01J 5/00* (2006.01)
*G08B 13/191* (2006.01)
*G07C 1/00* (2006.01)

(52) U.S. Cl.
CPC ................ *G07C 1/00* (2013.01); *G08B 13/191* (2013.01)
USPC ..................... 250/342; 250/316.1; 250/317.1; 250/318; 250/330; 250/338.3; 250/339.04; 250/339.14

(58) Field of Classification Search
CPC ......... G01J 5/00; G01J 5/0022; G01J 5/0025; G01J 5/02; G01J 5/10; G01J 5/12; G01J 5/20; G08B 13/00; G08B 13/18; G08B 13/194; G08B 13/19606; G08B 13/19608
USPC ................ 250/316.1, 317.1, 318, 330, 338.3, 250/339.04, 339.14, 342
See application file for complete search history.

(56) References Cited

U.S. PATENT DOCUMENTS 5,031,228 A * 7/1991 Lu ................................ 382/227
5,331,825 A 7/1994 Kim ................................ 62/180
5,493,118 A 2/1996 Okuda et al. ............... 250/338.3
6,376,812 B2 4/2002 Yamada et al. ............... 219/492
6,718,277 B2 4/2004 Sharma ......................... 702/132
6,759,954 B1 7/2004 Myron et al. ................. 340/522
7,164,116 B2 1/2007 Akagi ........................... 250/221
7,466,844 B2 12/2008 Ramaswamy et al. ......... 382/103
7,598,484 B2 10/2009 Yamaguchi ................... 250/221
7,800,049 B2 9/2010 Bandringa et al. ............ 250/239
8,411,963 B2 * 4/2013 Luff .............................. 382/194
8,620,088 B2 * 12/2013 Lee .............................. 382/192
8,660,308 B2 * 2/2014 Ramaswamy et al. ......... 382/103
2004/0141633 A1 * 7/2004 Horie ............................ 382/103
2004/0145658 A1 * 7/2004 Lev-Ran et al. .............. 348/143

(Continued)

OTHER PUBLICATIONS

Berger et al, Room Occupancy Measurement Using Low-Resolution Infrared Cameras , Jun. 2010, ISSC, UCC, Cork, pp. 1-6.*

(Continued)

*Primary Examiner* — David Porta
*Assistant Examiner* — Djura Malevic
(74) *Attorney, Agent, or Firm* — Myers Bigel Sibley & Sajovec, P.A.

(57) ABSTRACT

A system to detect occupants is provided. The system may rotate the field of views of multiple sensors in order to scan an area. The system may scan the area multiple times. The system may determine the number of occupants in the area based on a comparison of a scan of the area with a scan of the area when the area is determined to be unoccupied. The system may determine the number of occupants in the area based on a maximum number of occupants detected by any of the sensors. The system may also determine a location of an object or an occupant from scans of the area obtained from multiple sensors.

17 Claims, 5 Drawing Sheets

(56) References Cited

U.S. PATENT DOCUMENTS

| | | | | |
|---|---|---|---|---|
| 2005/0074140 | A1* | 4/2005 | Grasso et al. | 382/103 |
| 2006/0062429 | A1* | 3/2006 | Ramaswamy et al. | 382/103 |
| 2006/0200841 | A1* | 9/2006 | Ramaswamy et al. | 725/1 |
| 2006/0291695 | A1* | 12/2006 | Lipton et al. | 382/103 |
| 2007/0240515 | A1 | 10/2007 | Kessler et al. | 73/597 |
| 2009/0087039 | A1* | 4/2009 | Matsuura | 382/118 |
| 2009/0115617 | A1* | 5/2009 | Sano et al. | 340/573.1 |
| 2009/0290756 | A1* | 11/2009 | Ramaswamy et al. | 382/103 |
| 2010/0162285 | A1* | 6/2010 | Cohen et al. | 725/12 |
| 2010/0237695 | A1 | 9/2010 | Covaro et al. | 307/19 |
| 2012/0299728 | A1* | 11/2012 | Kirkpatrick et al. | 340/541 |

OTHER PUBLICATIONS

How Infrared Motion Detector Components Work, dated 2010, pp. 1-3, available at http://www.glolab.com/pirparts/infrared/.html.

Ivanov, B. et al., Presence Detection and Person Identification in Smart Homes, dated 2002, pp. 1-6, University of Bundeswehr Munich and University of Passau, Munich, Germany.

* cited by examiner

ROTATING SENSOR FOR OCCUPANCY DETECTION

BACKGROUND

1. Technical Field

This application relates to sensors and, in particular, to occupancy sensors.

2. Related Art

Infrared sensors may detect motion and, consequently, detect a presence of a person in a space when the person moves. However, when a person remains stationary in a room, an infrared sensor may fail to detect the person.

SUMMARY

A system may be provided that detects occupants. The system may include an occupant count module and two or more sensors, such as a first sensor and a second sensor. A field of view of the first sensor may be rotated over an area. A field of view of the second sensor may be rotated over the area. The second sensor may be positioned relative to the first sensor such that the field of view of the second sensor overlaps the field of view of the first sensor in at least a portion of the area. The occupant count module may determine a first number of occupants detected by the first sensor based on sensor data generated during the rotation of the field of view of the first sensor. In addition, the occupant count module may determine a second number of occupants detected by the second sensor based on sensor data generated during the rotation of the field of view of the second sensor. The occupant count module may determine a number of occupants in the area to be the largest one of the first number of occupants detected by the first sensor and the second number of occupants detected by the second sensor.

An apparatus may be provided to detect occupants. The apparatus may include a memory and a processor. The memory may include instructions executable by the processor. The instructions, when executed, may determine a first number of occupants detected by a first sensor based on sensor data generated by the first sensor, where the sensor data is generated from information collected during a rotation of a field of view of the first sensor over an area. The instructions, when executed, may also determine a second number of occupants detected by a second sensor based on sensor data generated by a second sensor, where the sensor data is generated from information collected during a rotation of a field of view of the second sensor over the area. The second sensor may be positioned relative to the first sensor such that the field of view of the second sensor overlaps the field of view of the first sensor in at least a portion of the area. The instructions, when executed, may determine a total number of occupants in the area to be the largest one of multiple detected occupancy numbers. The multiple detected occupancy numbers may include the first number of occupants detected by the first sensor and the second number of occupants detected by the second sensor.

A method may be provided for detecting occupants. A field of view of a first sensor may be rotated over an area. A field of view of a second sensor may be rotated over the area. The second sensor may be positioned relative to the first sensor such that the field of view of the second sensor overlaps the field of view of the first sensor in at least a portion of the area. A first number of occupants detected by the first sensor during the rotation of the field of view of the first sensor may be determined. A second number of occupants detected by the second sensor during the rotation of the field of view of the second sensor may be determined. The number of occupants in the area to be determined to be equal to the largest one of multiple detected occupancy numbers. The detected occupancy numbers may include the first number of occupants detected by the first sensor and the second number of occupants detected by the second sensor.

In one interesting aspect, the first number of occupants detected by the first sensor may be determined as the number of heat sources detected in the area by the first sensor that are not any heat sources detected when the area is determined to be unoccupied. In a second interesting aspect, a location or a position of a heat source, such as an occupant, in the area may be determined. Sensor data generated by the first sensor may be received from the first sensor, where the sensor data includes a first angle at which the first sensor is rotated when a heat source is detected by the first sensor. The sensor data generated by the second sensor may be received from the second sensor, where the sensor data includes a second angle at which the second sensor is rotated when the heat source is detected by the second sensor. The location of the heat source or occupant in two dimensions may be determined based on the first angle, the second angle, and spatial knowledge of the first sensor and second sensor.

Further objects and advantages of the present invention will be apparent from the following description, reference being made to the accompanying drawings wherein preferred embodiments of the present invention are shown.

BRIEF DESCRIPTION OF THE DRAWINGS

The embodiments may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

DETAILED DESCRIPTION

Figure 1:
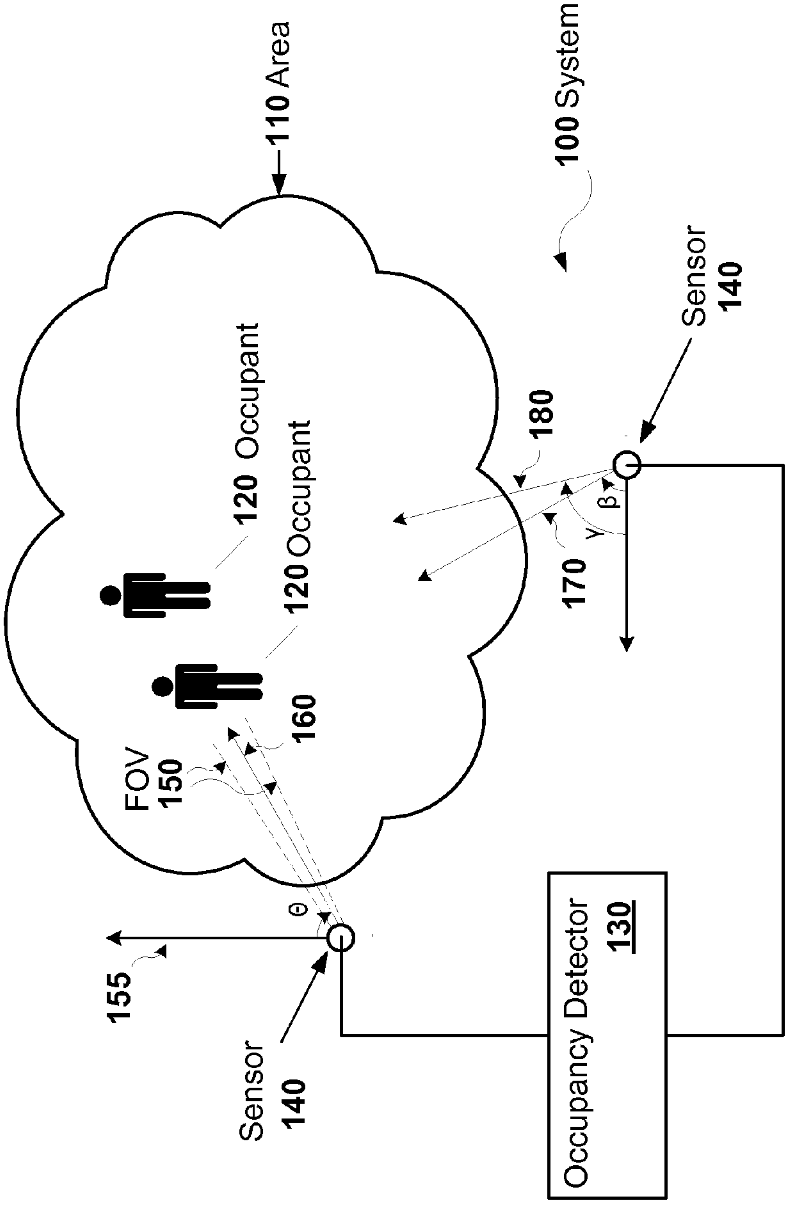
FIG. 1 illustrates an example of a system for detecting occupants of an area.

In one example, a system may be provided that detects occupants in an area. The system may include two or more sensors and an occupant count module. For example, the sensors may be thermal sensors that detect temperature and motion. A field of view of a first sensor may be rotated over an area. A field of view of a second sensor may be rotated over the area. The second sensor may be positioned relative to the first sensor such that the field of view of the second sensor overlaps the field of view of the first sensor in at least a portion of the area. For example, the first sensor may be located on a first wall of a room and the second sensor may be located on a second wall of the room that is perpendicular to the first wall of the room. When each sensor is positioned at 90 degrees from the respective wall, the field of view of the first sensor overlaps the field of view of the second sensor at a 90 degree angle. The occupant count module may determine how many occupants are detected by the first sensor based on sensor data generated during the rotation of the field of view of the first sensor. In addition, the occupant count module may determine how many occupants are detected by the second sensor based on sensor data generated during the rotation of the field of view of the second sensor. The occupant count module may determine that the total number of occupants in the area is equal to the largest number of occupants detected by any one of the sensors.

The occupant count module may generate a first image based on the sensor data generated during a first rotation of the field of view of the first sensor over the area when the area is unoccupied. The first image may include, for each heat source in the area detected by the first sensor during the first rotation, a corresponding angle at which the field of view of the first sensor is rotated when each heat source is detected.

The occupant count module may generate a second image based on sensor data generated by the first sensor during a second rotation of the field of view of the first sensor over the area. The second image may include, for each heat source in the area detected by the first sensor during the second rotation, a corresponding angle at which the field of view of the first sensor is rotated when each heat source is detected. The occupant count module may determine how many occupants are detected by the first sensor as the number of heat sources detected in the area by the first sensor during the second rotation that are not detected at corresponding angles of the field of view of the first sensor during the first rotation. The occupant count module may perform a similar process for sensor data generated by the second sensor in order to determine how many occupants are detected by the second sensor.

The sensors may be inexpensive because no chopper is required. A chopper may work in conjunction with an infrared sensor to remove noise and to generate a conditioned output signal. The chopper is a component that alternately blocks and unblocks infrared radiation input into the infrared sensor. A thermal detection system that includes the infrared sensor and the chopper may generate the conditioned signal by processing the unconditioned output signal generated by the infrared sensor. In particular, the conditioned signal may be determined by subtracting (1) the output of the infrared sensor when the input is blocked by the chopper from (2) the output of the infrared sensor when the input is unblocked. The system may determine the temperature at a location by applying a mathematical formula to the conditioned signal. In a system where the sensor includes a chopper, a stationary person may be detected at the location by determining that the detected temperature at the location falls within a predetermined temperature range that is characteristic of an occupant.

The system may accurately detect the number of occupants even if the occupants are stationary. The system may also determine locations of occupants based on the sensor data received from the multiple sensors.

FIG. 1 illustrates an example of a system 100 for detecting occupants 120 of an area 110. The system 100 may include an occupancy detector 130 and two or more sensors 140.

An occupant 120 may be a person, animal, or other heat producing object that may move in and out of an area 110. The area 110 may include any physical space, such as a room, a portion of a room, an entry way, an outdoor space, a patio, a store, or any other section of a building or land. The area 110 may be two-dimensional or three dimensional.

Each sensor 140 may be a sensor that detects objects. For example, the sensor 140 may include an infrared sensor, such as a pyroelectric infrared (PIR) sensor, a thermopile, or any other temperature sensing device. The sensor 140 may include a focusing element, such as a lens (see FIG. 4). The lens may be a Fresnel lens, for example. The sensor 140 may include one or more sensing elements (see FIG. 4) that detect radiation, such as thermal radiation, electromagnetic radiation, light, infrared, or any other type of energy. In one example, the sensor 140 may include two sensing elements connected in a voltage bucking configuration. The voltage bucking configuration may cancel common mode noise, such as signals caused by temperature changes and sunlight. A heat source passing in front of the sensor may activate first one sensing element, and then a second sensing element, whereas other sources may affect both sensing elements simultaneously and be cancelled.

Figure 4:
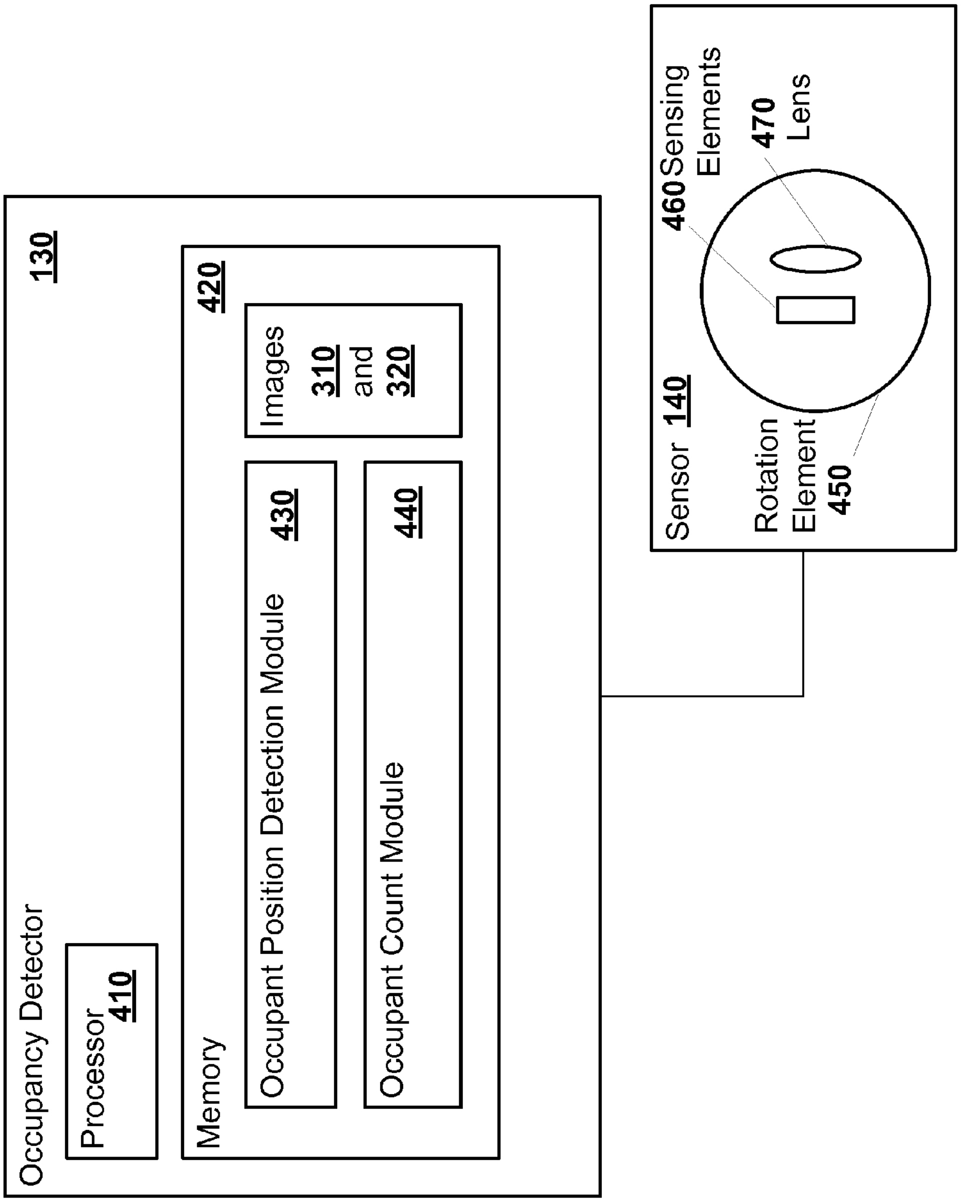
FIG. 4 illustrates an example of an occupancy detector and a sensor.

Each sensor 140 may include or be coupled to a rotation element (see FIG. 4). Each sensor 140—or a component of the sensor 140—may be rotated by the rotation element in order to detect a heat source such as an object or person that remains stationary. Examples of the rotation element may include a motor, an actuator, or a speaker coil arrangement. Alternatively or in addition, the rotation element may rotate the field of view 150 of each sensor 140. For example, the rotation element may rotate a mirror that directs light in the field of view 150 of the sensor 140 to the sensing element of the sensor 140.

In one example, the field of view 150 of each of the sensors 140 may be relatively narrow. The field of view 150 may be relatively narrow if the field of view 150 is less than 20 degrees. For example, the field of view 150 may be 10 degrees. The lens may be selected to provide the relatively narrow field of view 150.

During operation of the system 100, the system 100 may scan the area 110—or a portion of the area 110—by rotating each sensor 140 so that a field of view 150 of the sensor 140 sweeps the area 110. The area 110 may be scanned by each of the sensors 140 at the same time as the other sensors 140, at staggered times, or completely independently of the other sensors 140. As the sensor 140 is rotated, the position of the sensor 140 may range from one angular position to another angular position. For example, the angular position may range from zero degrees from a vertical line 155 illustrated in FIG. 1 to 180 degrees from the vertical line 155. Alternatively, the angular position of the sensor 140 may vary across any suitable range other than zero to 180 degrees.

Figure 2:
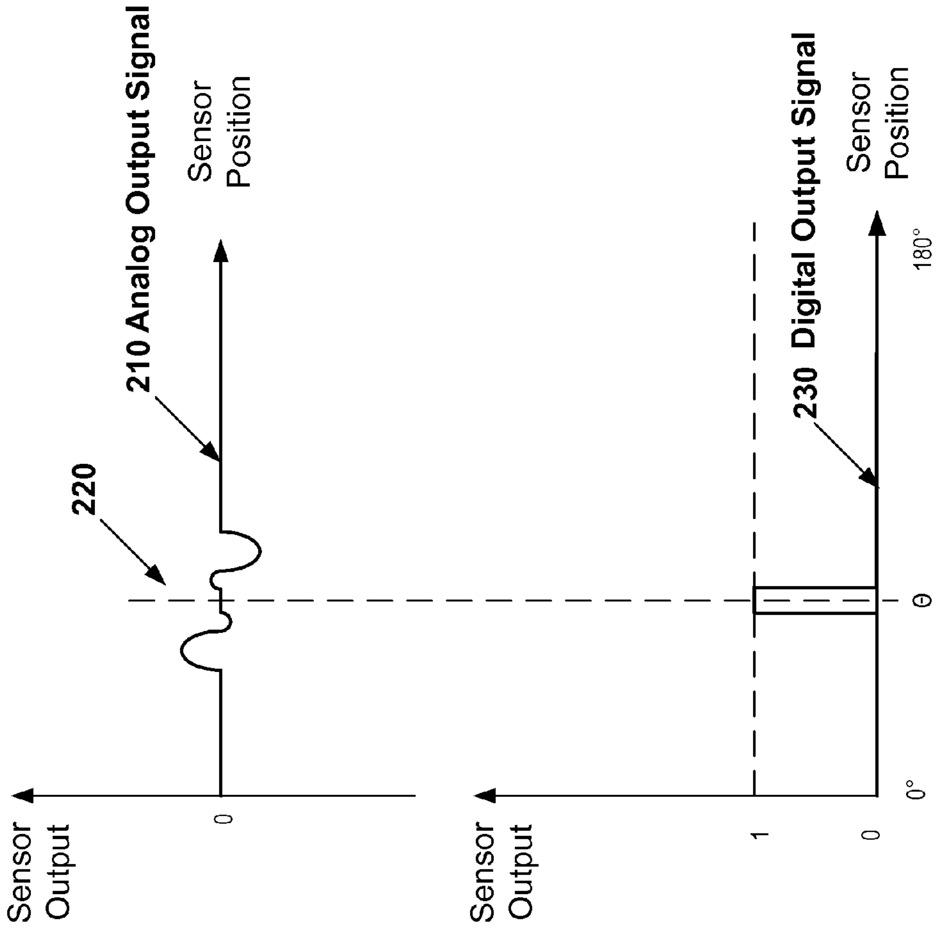
FIG. 2 illustrates an analog output signal and a digital output signal of a sensor as the sensor rotates.

FIG. 2 illustrates an example of an analog output signal 210 of the sensor 140 as the sensor 140 rotates from zero to 180 degrees. The multiple sensing elements included in the sensor 140 may cause an inverse symmetry 220 in the analog output signal 210 of the sensor 140 when the field of view 150 of the sensor 140 passes by a stationary object emitting thermal energy, such as the occupant 120. In the example illustrated in FIG. 2, the inverse symmetry 220 is located around position, θ, of the sensor 140. Referring to both FIG. 1 and FIG. 2, the inverse symmetry 220 detected when the sensor 140 is at position, θ, may indicate that the occupant 120 is located on a line 160 extending from the sensor 140 at an angle, θ. The line 160 extending from the sensor 140 may be a line of sight. Alternatively or in addition, a digital output signal 230 may indicate when the inverse symmetry 220 is detected in the analog output signal 210. The digital output signal 230 may be generated from the analog output signal 210. In one example, an analog gain/filter stage may generate the digital output signal. In a second example, DSP processing, such as delta-sigma processing, may yield the digital output signal 230. The sensor 140 may generate the digital output signal 230. Alternatively, a circuit not included in the sensor 140 may generate the digital output signal 230. An indication in the digital output signal 230, such a change in state of the digital output signal 230, which is generated when the sensor 140 is at position, θ, may indicate that the occupant 120 is located on the line 160 extending from the sensor 140 at the angle θ. The occupancy detector 130 may receive the indication from the sensor 140 that the occupant 120 is located on the line 160 extending from the sensor 140 at the angle θ.

Two or more occupants 120 may be located on the line 160 extending from the sensor 140 at the angle, θ. The sensor 140 may not be able to distinguish between the presence of one occupant 120 on the line 160 and the presence of two or more occupants 120 on the line 160. Nevertheless, the occupancy detector 130 may receive information from one or more additional sensors 140 that indicates one of the occupants 120 is located on a line 170 extending from the additional sensor 140 at an angle, β, and a second one of the occupants 120 is located on a line 180 extending from the additional sensor 140 at an angle, γ. The occupancy detector 130 may determine, or be provided with, the position of the sensors 140 relative to each other. Accordingly, the occupancy detector 130 may determine a position of each of the occupants 120 in the area 110 using geometric and trigonometric algorithms even though multiple occupants 120 may be on one of the lines 160, 170, and 180 extending from the sensors 140. The position of each of the occupants 120 in the area 110 may be a two-dimensional position. Alternatively or in addition, the occupancy detector 130 may determine the number of occupants 120 in the area 110.

Figure 3:
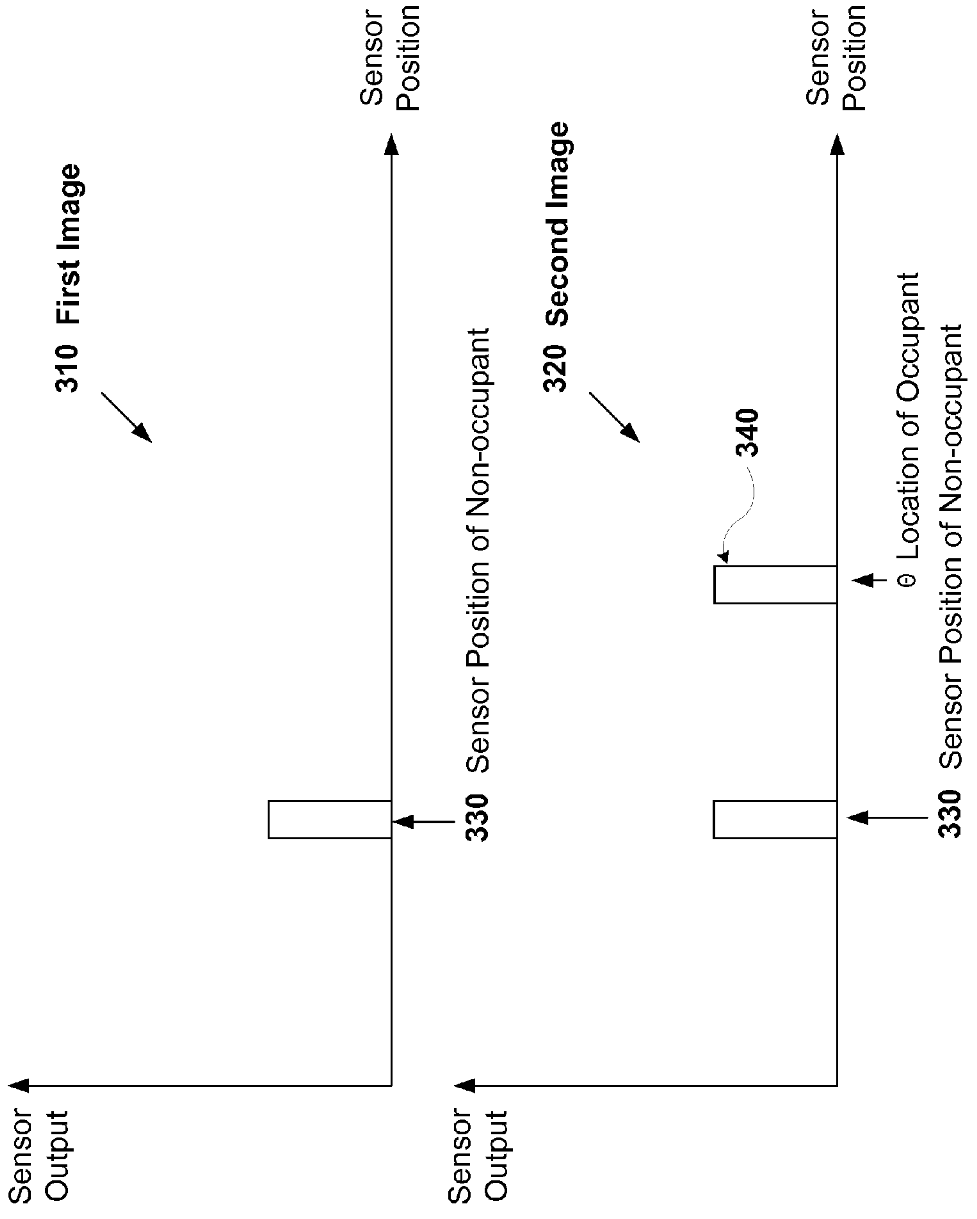
FIG. 3 illustrates a first image and a second image of the area obtained by scanning an area.

During operation of the system, the system 100 may characterize a coverage area, such as the area 110 in FIG. 1, by scanning the coverage area 110 when the area 110 is unoccupied. FIG. 3 illustrates a first image 310 and a second image 320 of the area 110 obtained by scanning the coverage area 110 with one of the sensors 140 at a first and second time, respectively. The first image 310 is obtained by rotating the sensor 140 when the coverage area 110 is unoccupied. The system 100, such as the occupancy detector 130 and/or the sensor 140, may obtain and store the first image 310 of the coverage area 110. Each of the images 310 and 320 may include a value of a sensor output signal 210 or 230 for each corresponding sensor position in a range of sensor positions. The first image 310 may identify one or more sensor positions 330 at which heat sources are detected, such as coffee pots, heating vents, or other sources of thermal energy. The system 100 may determine that the detected heat sources in the first image 310 are non-occupants because the first image 310 is obtained when the coverage area 110 is unoccupied.

The system 100 may determine that the area 110 is unoccupied based on user input, from other sensors detecting that the area 110 is unoccupied, from scheduling information, or from any other indication that the room is unoccupied. For example, in response to displaying a question on a display device that asks whether the area 110 is occupied, the occupancy detector 130 may receive user input that indicates the area 110 is presently unoccupied.

While the first image 310 may characterize the area 110 when the area 110 is unoccupied, the system 100 may rotate the sensor 140 at some other time in order to obtain the second image 320 of the coverage area 110. Like the first image 310, the second image 320 may identify the positions 330 of the sensor 140 at which the sensor 140 detects heat sources that are not occupants, such as coffee pots, heating vents, or other sources of thermal energy. In addition, the second image 320 may identify the positions 330 of the sensor 140 at which the sensor 140 detects heat sources that are occupants 120. The system 100 may compare the first image 310 with the second image 320 and determine any differences between the images 310 and 320. For example, by subtracting the first image 310 from the second image 320, the noise and/or non-occupants may be removed. The first and second images 310 and 320 may include noise from the sensor 140, if, for example, the sensor output values in the images 310 and 320 are values of the analog output signal 210 and the sensor 140 does not include a chopper. Alternatively or in addition, the occupant 120 or occupants 120 may be detected by identifying any spikes or peaks 340 in the second image 320 that are not in the first image 310. The spikes or peaks 340 may be transitions from high to low, or from low to high, in a digital signal. In an analog signal, the spikes 340 may be identified where the values of the analog sensor output signal exceed a predetermined threshold value. Alternatively or in addition, the occupant 120 may be detected by determining that a temperature detected at a particular position, θ, falls within a predetermined temperature range that is characteristic of the occupant 120. For example, the first and second images 310 and 320 may be a copy of the analog output signal 210 taken at two different times, and the occupant 120 is detected by determining that the difference between the first image 310 and the second image 320 at a particular position falls within a predetermined range of values. Thus, for example, the occupant 120 may be located on the line 160, 170, or 180 extending from the sensor 140 at the angle indicated by the position of the sensor 140 where the spike 340 is detected in the second image 320, but not in the first image 310.

The system 100 may make multiple scans over time and use the first image 310 as the reference image for comparison with each of the subsequent scans. The system 100 may update the reference image over time. For example, the system 100 may update the reference image whenever the area is 110 is determined to be unoccupied. Alternatively or in addition, the system 100 may update the reference image at a particular time of day when the area 110 is likely to be unoccupied.

The system 110 may use heuristics to aid in distinguishing between the occupants 120 and heat generating objects that are not occupants 120. In particular, the system 100 may determine locations of heat sources detected by the sensors 140 in the area 110 that are not occupants 120 based on heuristic data that indicates a heat source at a location is a stationary non-occupant. Stationary items such as windows, coffee pots, etc. may generate heat signals but may not move. Accordingly, the system 100 may learn where these items typically reside and ignore such items if detected a predetermined number of times in the same location.

The system 100 may import or otherwise incorporate architectural drawings. From the architectural drawings and/or other information, the system 100 may obtain spatial knowledge of where the sensors 140 are in relation to each other. Also from the architectural drawings and/or other information, the system 100 may obtain spatial knowledge of where the sensors 140 are in relation to other objects, such as windows, light fixtures, heating vents, cooling vents, and other types of fixtures. The system may identify, from the spatial knowledge, heat generating objects in the coverage area 110 that are not occupants 120. The location of the sensor 140 in a room or space and/or a rotational position of the rotation element that rotates the sensor 140 may be tracked as the sensor 140 is rotated. If a heat source is detected at a location that the spatial knowledge indicates a fixture is located that generates heat, the heat source may be determined to be a non-occupant.

The spatial knowledge may also be used to locate objects in the coverage area 110. For example, two sensors 140 may be positioned on adjacent walls that are perpendicular to each other. Each one of the sensors 140 may scan the coverage area 110 vertically, horizontally, or from some other orientation. Alternatively or in addition, each one of the sensors 140 may be moved, rotated, or both, so as to trace a pattern over the coverage area 110. The system 100 may produce a one-dimensional image 310 or 320 from each respective signal generated by each sensor 140.

As described above, heat-generating objects may be detected from the one-dimensional images 310 and 320. As described below, a two-dimensional or three-dimensional location of any of the detected objects may be determined from a combination of the relative position of the sensors 140 and the one-dimensional images 310 or 320 obtained from two or more of the sensors 140.

The occupancy detector 130 may determine the two-dimensional or three-dimensional location of the detected object in any number of ways. For example, the occupancy detector 130 may determine the two-dimensional location of a detected object using trigonometry and geometry based on each angle to the detected object from the corresponding sensor 140 and the location of one or more of the sensors 140. For example, if the two-dimensional location of a line segment extending from a first one of the sensors 140 to a second one of the sensors 140 is known, then the occupancy detector 130 may use triangulation to determine the two-dimensional position of the detected object. The sensors 140 may be two points of a triangle, where the location of the detected object may be fixed as a third point of the triangle with one known side and two known angles. The known side may be the two-dimensional location of the line segment, and the two known angles may be determined from the angles of the sensors 140 when the detected object was detected.

A third sensor 140 may provide information to determine a three-dimensional location of the detected object if the third sensor 140 is configured to scan the area 110 in a plane that is perpendicular to, or intersects with, a plane in which the first and second sensors 140 scanned the area 110. If the location of the third sensor 140 is known, then three of the four points of a triangular pyramid are known, and the location of a fourth point—the location of the detected object—may be determined. The occupancy detector 130 may use information from any number of sensors 140 in combination with knowledge of the locations of the sensors 140 in order to determine locations of the detected objects.

In one example, the area 110 may be the area included in a square or rectangular room, where the sensors 140 include four sensors, where a corresponding one of the sensors 140 is mounted on, or adjacent to, each of the four walls. By positioning three or more sensors such that the center of the field of view 150 of each of the sensors 140 intersects the center of the field of view 150 of another one of the sensors 140 at an angle greater than 20 degrees, for example, the system may provide redundancy and limit the possibility that any occupant 120 is undetected by the system 100. The angle of intersection of the centers of the field of views 150 may be formed by line segments extending from the point of intersection to each of the sensors 140.

The system 100 may provide an ability to accurately count the occupants 120. The sensors 140 may be positioned so that the field of view 150 of each of the sensors 140 is perpendicular to—or at an angle to—the field of view 150 of the other sensors 140 if the sensors 140 are each rotated to a respective particular position. For example, three sensors 140 may be positioned such that the field of view 150 of each of the sensors 140, if all of the sensors 140 are at a midpoint of the range of angles through which the sensors 140 rotate, intersect at 30 degrees with the field of view 150 of another one of the three sensors 140. Even if a first occupant 120 stands directly in front of a second occupant 120 so that one of the sensors 140 cannot detect the second occupant 120, then one of the other sensors 140 may detect the second occupant 120. Accurately counting the occupants 120 may be useful in determining when to shut off lights or for other purposes that are business specific. For example, accurately counting people may be useful for tracking the number of customers in retail stores, the location of the customers within the retail stores, or other types of tracking uses.

The occupancy detector 130 may determine the number, $N_i$ of occupants 120 detected by each of the sensors 140, where i identifies the sensor 140 that detected the occupants 120. The occupancy detector 130 may determine the total number of occupants 120 in the area 110 as the maximum number, $N_i$ of occupants 120 detected by any one of the sensors 140.

As discussed above, the sensor 140 may be rotated with a rotation element. Alternatively or in addition, an optical assembly, such as a lens or a mirror may be rotated with the rotation element so that the field of view 150 of the sensor 140 may be swept across the area 110. Thus, in one example, instead of rotating the sensor, just the field of view 150 of the sensor 140 may be rotated.

The sensors 140 may be able to detect distance between the sensor 140 and the detected object or other positional information. Accordingly, the images 310 and 320 may include two-dimensional data instead of just one-dimensional data available when the distance between the sensor 140 and the detected object is unavailable. In other examples, the sensors 140 may be of a type different than infrared sensors. For example, the sensors 140 may detect ultrasound, X-band, or some other type of radiation.

The system 100 may operate as a ranging system. Because the system 100 may determine the position of a detected object in the area 110, the system 100 may determine the distance between the detected object and another object, such as one of the sensors 140, a door, a window, or any other object.

The system 100 may include fewer, additional, or different components. For example, the system 100 may include just the occupancy detector 130 but not the sensors 140 that the occupancy detector 130 communicates with. In one example, the system 100 may include a power device (not shown) and light fixtures (not shown). The occupancy detector 130 may be included in the power device. The power device may power the light fixtures when the occupancy detector 130 determines that the area 110 is occupied. The power device may decrease the power supplied to the light fixtures—or turn the light fixtures off—if the occupancy detector 130 determines that the area 110 is unoccupied.

FIG. 4 illustrates an example of the occupancy detector 130 and one of the sensors 140. The occupancy detector 130 may include a processor 410 and a memory 420. The memory 420 may hold the programs and processes that implement the logic described above for execution with the processor 410. As examples, the memory 420 may store program logic that implements an occupant position detection module 430, an occupant count module 440, or another part of the system 100. The occupant position detection module 430 may determine the position of each of the occupants 120 in the area 110 as described above. The occupant count module 440 may determine the total number of occupants 120 detected in the area 110 as described above.

The memory 420 may be any now known, or later discovered, device for storing and retrieving data or any combination thereof. The memory 420 may include non-volatile and/or volatile memory, such as a random access memory (RAM), a read-only memory (ROM), an erasable programmable read-only memory (EPROM), or flash memory. Alternatively or in addition, the memory 420 may include an optical, magnetic (hard-drive) or any other form of data storage device.

The processor 410 may be one or more devices operable to execute computer executable instructions or computer code embodied in the memory 420 or in other memory to perform the features of the system 100. The computer code may include instructions executable with the processor 410. The computer code may be written in any computer language now known or later discovered, such as C++, C#, Java, Pascal, Visual Basic, Perl, HyperText Markup Language (HTML), JavaScript, assembly language, shell script, or any combination thereof. The computer code may include source code and/or compiled code.

The processor 410 may be in communication with the memory 420. The processor 410 may also be in communication with additional components, such as the sensors 140. The processor 410 may include a general processor, a central processing unit, a server device, an application specific integrated circuit (ASIC), a digital signal processor, a field programmable gate array (FPGA), a digital circuit, an analog circuit, a microcontroller, any other type of processor, or any combination thereof. The processor 410 may include one or more elements operable to execute computer executable instructions or computer code embodied in the memory 420 or in other memory that implement the features of the system 100. The memory 420 may include data structures used by the computer code. For example, the memory 420 may include the images 310 and 320.

The sensor 140 may include the rotation element 450, one or more sensing elements 460, and one or more lenses 470. The sensor 140 may include additional, fewer, or different components.

In one example, the sensor 140 may include a lateral displacement element that moves the sensor 140 or the field of view 150 of the sensor 140 laterally instead of, or in addition to, rotating the sensor 140 or the field of view 150.

In a second example, the sensor 140 may include a processor and a memory, such as the processor 410 and the memory 420 included in the occupancy detector 130. The processor in the sensor 140 may perform all or a portion of the logic in the system 100. For example, the processor in the sensor 140 may generate one or more of the images 310 and 320. The processor in the sensor 140 may generate the digital output signal 230 from the analog output signal 210.

In a third example, the sensor 140 may include communication circuitry that communicates with the occupancy detector 130. For example, the sensors 140 may be distributed over a network.

The system 100 may be implemented in many different ways. For example, although some features are shown stored in computer-readable memories (e.g., as logic implemented as computer-executable instructions or as data structures in memory), all or part of the system 100 and its logic and data structures may be stored on, distributed across, or read from other machine-readable media. The media may include hard disks, floppy disks, CD-ROMs, a signal, such as a signal received from a network or received over multiple packets communicated across the network.

Alternatively or in addition, all or some of the logic 430 and 440 may be implemented as hardware. For example, the occupant position detection module 430 and the occupant count module 440 may be implemented in an application specific integrated circuit (ASIC), a digital signal processor, a field programmable gate array (FPGA), or a digital circuit, an analog circuit.

The processing capability of the system 100 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (e.g., a dynamic link library (DLL)).

Figure 5:
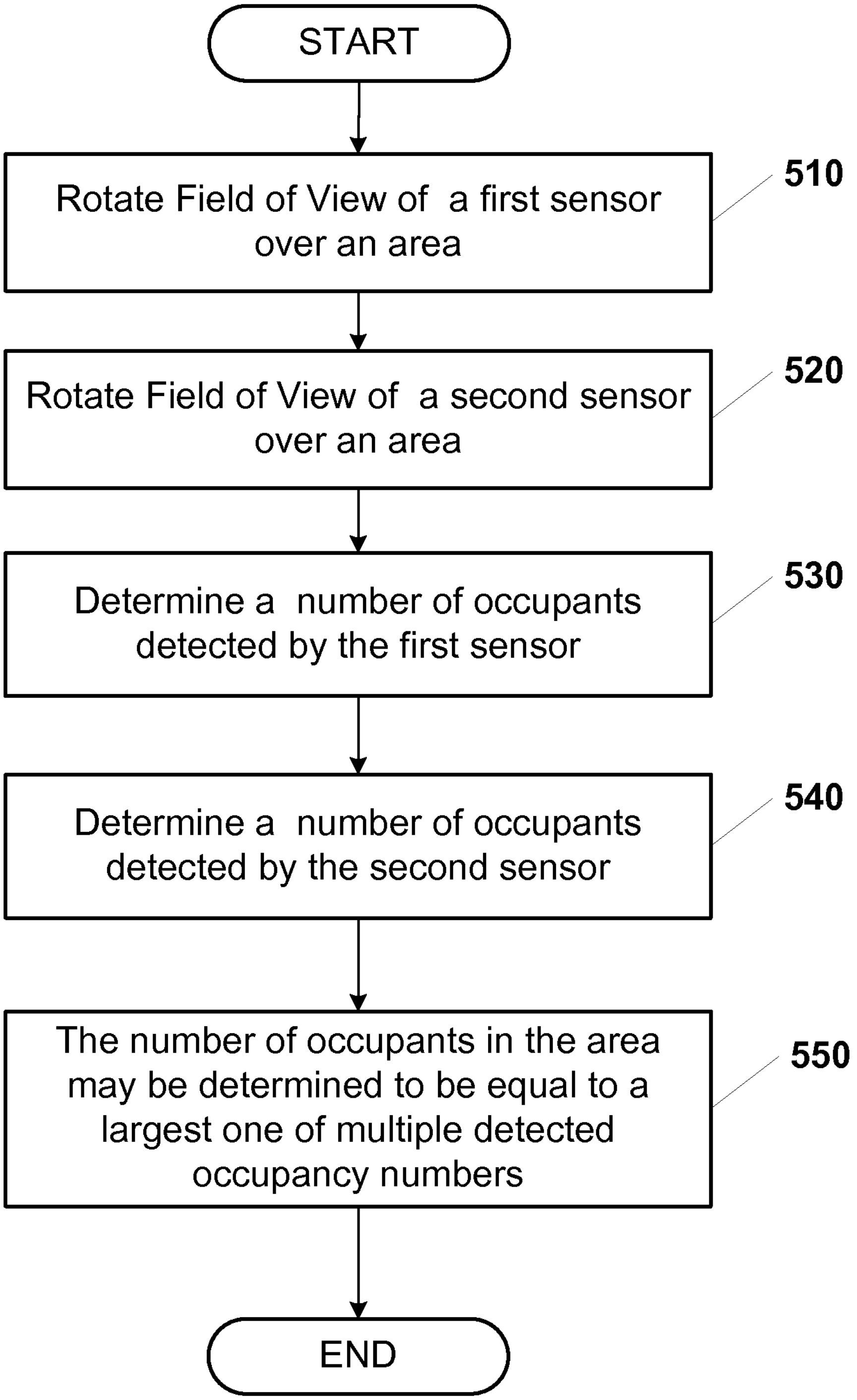
FIG. 5 illustrates an example flow diagram of the logic of a system for detecting occupants.

FIG. 5 illustrates an example flow diagram of the logic of the system 100. The logic may include additional, different, or fewer operations. The operations may be executed in a different order than illustrated in FIG. 5.

The field of view 150 of a first one of the sensors 140 may be rotated (510) over the area 110. The field of view 150 of a second one of the sensors 140 may be rotated (520) over the area 110. The second one of the sensors 140 may be positioned relative to the first one of the sensors 140 such that the field of view 150 of the second sensor 140 overlaps the field of view of view 150 of the first sensor 140 in at least a portion of the area 110.

A first number of occupants 120 detected by the first sensor 140 during the rotation of the field of view 150 of the first sensor 140 may be determined (530). A second number of occupants 120 detected by the second sensor 140 during the rotation of the field of view 150 of the second sensor 140 may be determined (540).

The operations may end with a determination that the number of occupants 120 in the area 110 is equal to the largest one of multiple detected occupancy numbers that include the first number of occupants 120 detected by the first sensor 140 and the second number of occupants 120 detected by the second sensor 140 (550). Alternatively, the operations may end with a determination of a position or location of each of the occupants 120 in the area 110.

All of the discussion, regardless of the particular implementation described, is exemplary in nature, rather than limiting. For example, although selected aspects, features, or components of the implementations are depicted as being stored in memories, all or part of systems and methods consistent with the innovations may be stored on, distributed across, or read from other computer-readable storage media, for example, secondary storage devices such as hard disks, floppy disks, and CD-ROMs; or other forms of ROM or RAM either currently known or later developed. The computer-readable storage media may be non-transitory computer-readable media, which includes CD-ROMs, volatile or non-volatile memory such as ROM and RAM, or any other suitable storage device. Moreover, the various modules are but one example of such functionality and any other configurations encompassing similar functionality are possible.

Furthermore, although specific components of innovations were described, methods, systems, and articles of manufacture consistent with the innovation may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same program. The components may be resident on separate hardware, such as separate removable circuit boards, or share common hardware, such as a same memory and processor for implementing instructions from the memory. Programs may be parts of a single program, separate programs, or distributed across several memories and processors.

The respective logic, software or instructions for implementing the processes, methods and/or techniques discussed above may be provided on computer-readable media or memories or other tangible media, such as a cache, buffer, RAM, removable media, hard drive, other computer readable storage media, or any other tangible media or any combination thereof. The tangible media include various types of volatile and nonvolatile storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system.

While various embodiments of the innovation have been described, it will be apparent to those of ordinary skill in the art that many more embodiments and implementations are possible within the scope of the innovation. Accordingly, the innovation is not to be restricted except in light of the attached claims and their equivalents.

What is claimed is:

1. A system to detect occupants, the system comprising:

a first sensor configured to rotate a field of view of the first sensor over an area;

a second sensor configured to rotate a field of view of the second sensor over the area, the second sensor positioned relative to the first sensor such that the field of view of the second sensor overlaps the field of view of the first sensor in at least a portion of the area; and an occupant count module configured to:

determine a first number of occupants detected by the first sensor based on sensor data generated during the rotation of the field of view of the first sensor;

determine a second number of occupants detected by the second sensor based on sensor data generated during the rotation of the field of view of the second sensor; and determine a number of occupants in the area to be a largest one of the first number of occupants detected by the first sensor and the second number of occupants detected by the second sensor.

2. The system of claim 1 further comprising a memory, wherein the rotation of the field of view of the first sensor is a first rotation of the field of view of the first sensor, and wherein the occupant count module is further configured to store a first image in the memory, the first image is based on the sensor data generated during the first rotation of the field of view of the first sensor over the area when the area is unoccupied, the first image comprising, for each heat source in the area detected by the first sensor during the first rotation, a corresponding angle at which the field of view of the first sensor is rotated when each heat source is detected.

3. The system of claim 2, wherein the occupant count module is further configured to store a second image in the memory, the second image being based on sensor data generated by the first sensor during a second rotation of the field of view of the first sensor over the area, the second image comprising, for each heat source in the area detected by the first sensor during the second rotation, a corresponding angle at which the field of view of the first sensor is rotated when each heat source is detected.

4. The system of claim 3, wherein the occupant count module is further configured to determine the first number of occupants detected by the first sensor based on a comparison of the first image and the second image.

5. The system of claim 3, wherein the occupant count module is further configured to determine that the first number of occupants detected by the first sensor is a number of heat sources detected in the area by the first sensor during the second rotation that are not detected at corresponding angles of the field of view of the first sensor during the first rotation.

6. The system of claim 3, wherein a corresponding temperature of each heat source detected in the area by the first sensor during the second rotation of the field of view of the first sensor is determined from a difference between a first corresponding analog output value of the first sensor in the first image and a second corresponding analog output value of the first sensor in the second image, the first and second corresponding analog output values corresponding to an angle at which the field of view of the first sensor is rotated when each heat source is detected.

7. The system of claim 3, wherein the first sensor and the second sensor are thermal sensors.

8. An apparatus to detect occupants, the apparatus comprising:

a memory; and a processor in communication with the memory, the memory comprising instructions executable by the processor to:

determine a first number of occupants detected by a first sensor based on sensor data generated by the first sensor, wherein the sensor data is generated from information collected during a rotation of a field of view of the first sensor over an area;

determine a second number of occupants detected by a second sensor based on sensor data generated by a second sensor, wherein the sensor data is generated from information collected during a rotation of a field of view of the second sensor over the area, the second sensor positioned relative to the first sensor such that the field of view of the second sensor overlaps the field of view of the first sensor in at least a portion of the area; and determine a total number of occupants in the area to be a largest one of a plurality of detected occupancy numbers, the detected occupancy numbers comprising the first number of occupants detected by the first sensor and the second number of occupants detected by the second sensor.

9. The apparatus of claim 8, wherein the rotation of the field of view of the first sensor is a first rotation of the field of view of the first sensor, a reference image is generated from information collected during a second rotation of the field of view of the first sensor over the area when the area is unoccupied, the reference image indicates a location of any heat source that is not an occupant, and the first number of occupants detected by the first sensor is based on a number of heat sources detected in the area from the information collected during the first rotation of the field of view of the first sensor that are not at the location of any heat source that the reference image indicates is not an occupant.

10. The apparatus of claim 8, wherein the memory further comprises instructions executable by the processor to:

receive the sensor data generated by the first sensor from the first sensor, the sensor data comprising a first angle at which the first sensor is rotated when a heat source is detected by the first sensor;

receive the sensor data generated by the second sensor from the second sensor, the sensor data comprising a second angle at which the second sensor is rotated when the heat source is detected by the second sensor; and determine a location of the heat source in two dimensions based on the first angle, the second angle, and a spatial knowledge of the first sensor and second sensor.

11. A method for detecting occupants, the method comprising:

rotating a field of view of a first sensor over an area;

rotating a field of view of a second sensor over the area, the second sensor positioned relative to the first sensor such that the field of view of the second sensor overlaps the field of view of the first sensor in at least a portion of the area;

determining a first number of occupants detected by the first sensor during the rotation of the field of view of the first sensor;

determining a second number of occupants detected by the second sensor during the rotation of the field of view of the second sensor; and determining a number of occupants in the area to be equal to a largest one of a plurality of detected occupancy numbers, the detected occupancy numbers comprising the first number of occupants detected by the first sensor and the second number of occupants detected by the second sensor.

12. The method of claim 11 further comprising determining a location of a heat source detected by the first and second sensors in the area based on a position of the first sensor relative to the second sensor.

13. The method of claim 11 further comprising determining locations of heat sources detected by the first and second sensors in the area that are not occupants by rotating the field of view of the first sensor and the field of view of the second sensor in response to a determination that the area is unoccupied.

14. The method of claim 13 further comprising determining the first number of occupants detected by the first sensor as the number of heat sources detected in the area by the first sensor that are not any of the heat sources determined not to be occupants when the area is unoccupied.

15. The method of claim 13 further comprising determining the second number of occupants detected by the second sensor as the number of heat sources detected in the area by the second sensor that are not any of the heat sources determined not to be occupants when the area is unoccupied.

16. The method of claim 11 further comprising determining locations of heat sources detected by the first and second sensors in the area that are not occupants based on heuristic data that indicates a heat source at a location is a stationary non-occupant.

17. The method of claim 11 further comprising determining locations of heat sources detected by the first and second sensors in the area that are not occupants by detecting heat sources at locations that spatial knowledge indicates are locations of heat generating fixtures.

* * * * *